United States Patent Office 3,318,921
Patented May 9, 1967

3,318,921
6-HALO-16-METHYL-3,20-DIKETO DERIVATIVES OF THE PREGNANE SERIES
John Edwards, Mexico City, Mexico, Carl Djerassi, Palo Alto, Calif., Howard J. Ringold, Shrewsbury, Mass., and George Rosenkranz, Mexico City, Mexico, assignors, by mesne assignments, to Syntex Corporation, a corporation of Panama
No Drawing. Filed Dec. 28, 1961, Ser. No. 162,915
Claims priority, application Mexico, Apr. 28, 1959, 54,401
16 Claims. (Cl. 260—397.3)

The present patent application is a continuation in part of our U.S. patent application Serial No. 20,271 filed April 2, 1960 and now abandoned.

The present invention relates to novel cyclopentanophenanthrene compounds and to a process for the preparation thereof.

More particularly the present invention relates to 6-(fluoro, chloro or bromo)-16-methyl-$\Delta^4$-pregnene-3,20-dione compounds which may further be substituted at C-21 by a hydroxyl or an acyloxy group, as well as the 1-dehydro, 6-dehydro and 1,6-bisdehydro derivatives thereof.

The novel compounds of the present invention are represented by the following formula:

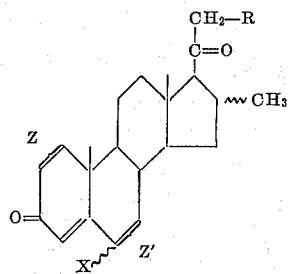

In the above formula Z and $Z^1$ indicate a double bond between C-1 and C-2 and between C-6 and C-7 respectively or a saturated linkage between C-1 and C-2 and between C-6 and C-7 respectively. The methyl group at C-16 is in the $\alpha$ or $\beta$ steric configuration; X represents fluorine, chlorine or bromine and when $Z^1$ is a saturated linkage, these halogens may be in the $\alpha$ or $\beta$ positions; and R represents hydrogen, hydroxyl or an acyloxy group. The latter is derived from a hydrocarbon carboxylic acid of less than 12 carbon atoms, including saturated or unsaturated, straight or branched chain aliphatic, cyclic or cyclic-aliphatic, optionally substituted with functional groups such as hydroxyl, acyloxy containing up to 12 carbon atoms, alkoxy containing up to 8 carbon atoms, amino or halogen such as fluorine, chlorine or bromine. Typical esters are the formate, acetate, propionate, butyrate, enanthate, caproate, benzoate, hemisuccinate, aminoacetate, trimethylacetate, phenoxyacetate, phenylpropionate and $\beta$-chloropropionate. The acyl groups may also be derived from sulfonic acids, sulfuric acid, phosphoric acid or halogenated acids. The present invention also includes water-soluble salts of the esters such as the alkali salts of the hemisuccinates, the disodium salts of esters with phosphoric acid or the hydrohalide salts of esters formed with amino-acids.

The novel compounds of the present invention are progesterone like hormones which exhibit particularly anti-estrogenic and anti-androgenic activity and also exhibit an antagonistic effect toward desoxycorticosterone. The novel 3-keto 5$\alpha$-hydroxy-6$\beta$-(fluoro, chloro or bromo) derivatives, as for example 16$\alpha$-methyl-6$\beta$-fluoro-5$\alpha$-hydroxy 3,20-diones are useful agents exhibiting central nervous system repressing activity. The novel compounds are also valuable intermediates for the preparation of important 6$\alpha$-halo-16-methylcortical hormones. Thus, by biological methods a hydroxyl group may be introduced at C-11; for example, by incubation of 16$\alpha$-methyl-6$\alpha$-fluoro-progesterone with Rhizopus nigricans ATCC 6227b, there is obtained 16$\alpha$-methyl-6$\alpha$-fluoro-11$\alpha$-hydroxyprogesterone, whereas incubation with bovine adrenal glands or with Cunninghamella bainieri ATCC 9244 affords 16$\alpha$-methyl-6$\alpha$-fluoro-11$\beta$-hydroxyprogesterone. By dehydration of the foregoing as by treatment with mesyl chloride in dimethylformamide-pyridine, the 16$\alpha$-methyl-6$\alpha$-fluoro-11-hydroxyprogesterones are converted into 16$\alpha$-methyl-6$\alpha$-fluoro-$\Delta^{4,9(11)}$-pregnadiene-3,20-dione, which compound upon treatment by the method of Fried et al., J. Am. Chem. Soc. 79, 1130 (1957) gives the corresponding 16$\alpha$-methyl-6$\alpha$-fluoro-9$\alpha$-halo-11$\beta$-hydroxyprogesterone, which is a potent glycogenic agent. Alternatively, by condensation of the 16$\alpha$-methyl-6$\alpha$-fluoro-11$\alpha$-hydroxyprogesterone or of 16$a$-methyl-6$\alpha$-fluoro-11-ketoprogesterone (formed by oxidation of the 11-hydroxy compounds) with ethyl oxalate to form the C-21 oxalyl derivative, followed by dibromination, rearrangement by reaction with sodium methoxide, formation of a 3-cycloethyleneketal, reduction with lithium aluminum hydride, acetylation at C-21, hydrolysis of the ketal group and oxidation of the $\Delta^{17(20)}$-double bond with phenyliodosoacetate as taught in copending application Serial No. 13,427 filed March 8, 1960 there is obtained the 21-acetate of 16$\alpha$-methyl-6$\alpha$-fluoro-epihydrocortisone or of 16$\alpha$ - methyl - 16$\alpha$ - fluoro - hydrocortisone, respectively. These compounds may be easily dehydrated as set forth above to form the 21-acetate of 16$\alpha$-methyl-6$\alpha$-fluoro-$\Delta^{4,9(11)}$-pregnadien-17$\alpha$, 21-diol-3,20-dione which can then be transformed via the method of Fried et al., supra, to 16$\alpha$-methyl-6$\alpha$-fluoro-9$\alpha$-halo-cortical hormones; the compounds can also be oxidized to form the 21-acetate of 16$\alpha$-methyl-6$\alpha$-fluoro-cortisone.

The novel compounds of the present invention are prepared by a process illustrated in part by the following equation:

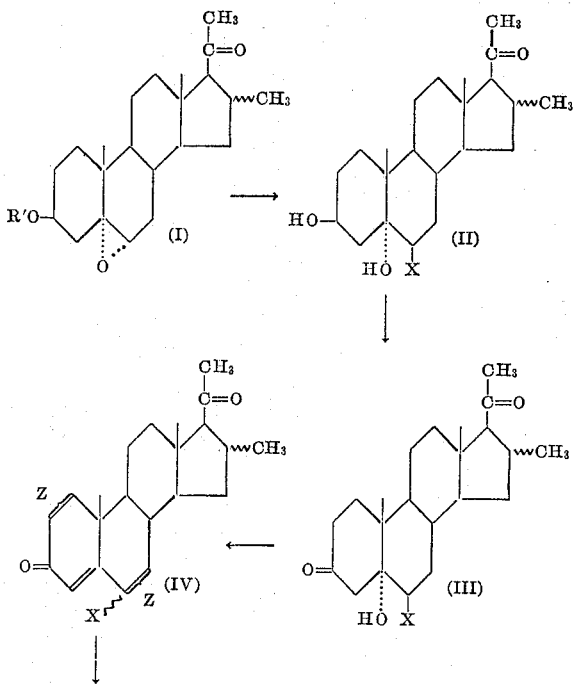

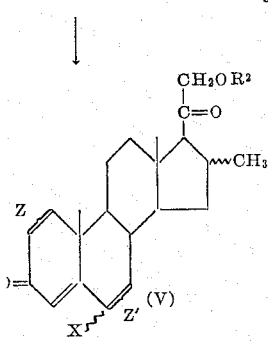

In the above formulae, X, Z and Z¹ have the same meaning as heretofore set forth; R¹ and R² are hydrogen [or] acyl of the type previously described.

In practicing the process outlined above, 16α-methyl-,6α-oxidopregnan-3β-ol-20-one acetate or 16β-methyl-,6α-oxidopregnan-3β-ol-20-one is treated with boron fluoride, hydrogen chloride or hydrogen bromide, to [gi]ve the corresponding 16-methyl-5α-hydroxy-6β-(fluoro, [ch]loro or bromo) derivative. In the case of the 16α-[m]ethyl-3β-acetoxy-5α-hydroxy-6β-halo derivatives, the [fre]e 3β-alcohols are obtained by hydrolysis in a basic [m]edium such as potassium carbonate solution.

The obtained 16α-methyl-3β,5α-dihydroxy-6β-halo de[ri]vatives are oxidized by reacting an acetone solution of [an]y of these compounds with dilute chromic acid, preferably 8 N chromic acid in dilute sulfuric acid, to form [th]e corresponding 3-keto-compounds, namely, the 16α-[m]ethyl-6β-halo-pregnan-5α-ol-3,20-diones or the 16β-[m]ethyl-6β-halo-pregnan-5α-ol-3,20-diones. Upon treat[m]ent with a mineral acid, dehydration with or without [si]multaneous inversion of the steric configuration at C–6 [is] effected. Thus, treatment with dilute hydrochloric acid [in] acetic acid resulted in dehydration to afford the cor[re]sponding 16α-methyl-6β-halo-Δ⁴-pregnen-3,20-dione or [16]β - methyl - 6β - halo - Δ⁴ - pregnene - 3,20 - dione re[sp]ectively. Treatment with dry hydrogen chloride in [gl]acial acetic acid solution resulted in the formation of [th]e corresponding 16α-methyl-6β-halo-Δ⁴-pregnene-3,20-[di]one and 16β - methyl - 6α - halo - Δ⁴ - pregnene - 3,20-[di]one, respectively. The 6β-halo compounds can also be [co]nverted into the 6α-halo compounds by the treatment [w]ith dry hydrogen chloride in glacial acetic acid.

Upon subsequent refluxing with selenium dioxide in [m]ixture with tertiary butanol and in the presence of cata[ly]tic amounts of pyridine, there is obtained the 1-de[hy]dro redivatives of the foregoing compounds; by re[fl]uxing with chloranil in ethyl acetate and acetic acid solu[ti]on, or in xylene, a double bond is introduced at C–6, 7. [B]y combining these methods of dehydrogenation there is [ob]tained the respective 1,4,6-trienes, which may also be [pr]epared from the Δ⁴ compounds by refluxing with chlor[an]il in n-amyl alcohol.

For introduction of the C–21 acetoxy group, the 16-[m]ethyl-6-halo-progesterones are transformed into their [2]1-iodo derivatives by reaction with iodine and calcium [o]xide in admixture with tetrahydrofuran and methanol. [T]he resulting 16-methyl-6-halo-21-iodo-progesterones are [th]en refluxed with potassium acetate in acetone under [an]hydrous conditions to produce the corresponding 21-[ac]etoxy compounds, namely the 21-acetates of the 16β-[m]ethyl-6β-halo-desoxycorticosterones; 16β - methyl - 6α-[ha]lo - desoxycorticosterones; 16α - methyl - 6β - halo-[d]esoxycorticosterones and 16α-methyl-6α-halo-desoxy-[c]orticosterone. By applying the methods of dehydrogena[ti]on set forth above, double bonds at C–1, 2 and/or [C–]6, 7 of the 21-acetates of 16-methyl-6-halo-desoxy-[c]orticosterones are introduced. The acetoxy group is [h]ydrolyzed by conventional methods with dilute meth[a]nolic potassium hydroxide to the hydroxyl group which [c]an then be re-esterified with other acyl groups of the [t]ype hereinabove described.

The various steps set forth above which are described in detail in the examples can be modified within wide limits. For example, dehydration at C–5 can be carried out with mineral acids such as sulfuric acid, hydrobromic or hydrofluoric acid and the acetic acid may be replaced by an inert solvent such as acetone; when the dehydration is carried out under anhydrous conditions for a prolonged period of time, inversion of the steric configuration at C–6 accompanies the dehydration; when the dehydration is effected in the presence of water and/or for a short period of time, the fluorine atom at C–6 retains the β-configuration. The introduction of the additional double bond at C–1, 2 can also be effected by conventional known microbiological methods, for example, by incubation with Corynebacterium simplex ATCC 6946.

The following specific examples serve to illustrate but are not intended to limit the scope of the present invention.

EXAMPLE 1

To a solution of 5 g. of 16α-methyl-5α,6α-oxido pregnan-3β-ol-20-one acetate. (Ringold et al. U.S. patent application Ser. No. 789,242 filed Jan. 27, 1959) in 250 cc. of ether and 250 cc. of benzene were added 5 cc. of freshly distilled boron trifluoride etherate. The reaction mixture was left at room temperature overnight. After addition of water, the organic layer was separated, washed with water, dried over anhydrous sodium sulfate and evaporated under reduced pressure. The residue was recrystallized from methylene chloride-hexane affording 16α - methyl - 6β - fluoro - pregnane - 3β,5α - diol - 20-one 3-acetate.

Following the same procedure there was treated 16β-methyl-5α,6α-oxido pregnan-3β-ol-20-one (Djerassi U.S. patent application Serial No. 792,964 filed February 13, 1959) thus yielding 16β-methyl-6β-fluoro pregnane-3β,5α-diol-20-one.

EXAMPLE 2

To a solution of 4 g. of 16α-methyl-5α,6α-oxido-pregnan-3β-ol-20-one acetate in 40 cc. of anhydrous chloroform, was added, over a period of 35 minutes, 30 cc. of a 0.45 N solution of dry hydrogen chloride in chloroform, under continuous stirring and maintaining the temperature around 0° C. The mixture was then stirred at 0° C. for 1 hour further, diluted with water and the chloroform layer was separated, washed with aqueous sodium bicarbonate solution and then with water, dried over anhydrous sodium sulfate and evaporated under reduced pressure. Crystallization of the residue from acetone-hexane gave 16α-methyl-6β-chloro-pregnane-3β,5α-diol-20-one-3-acetate.

Following the preceding technique, there was treated 16β-methyl-5α,6α-oxido-pregnan-3β-ol-20-one, thus affording 16β-methyl-6β-chloropregnane-3β,5α-diol-20-one.

EXAMPLE 3

The starting compounds of the foregoing example were treated following the procedure described in the same example except that hydrogen chloride was substituted by hydrogen bromide, thus furnishing 16α-methyl-6β-bromopregnane-3β,5α-diol-20-one, 3-acetate and 16β-methyl-6β-bromo-pregnane-3β,5α-diol-20-one.

EXAMPLE 4

A suspension of 5 g. of 16α-methyl-6β-fluoro-pregnane-3β,5α-diol-20-one-3-acetate in 300 cc. of methanol was treated with a solution of 5 g. of potassium carbonate in 30 cc. of water; the mixture was boiled under reflux for 1 hour and then cooled in ice and diluted with water. The formed precipitate was collected and recrystallized from acetone hexane to yield 16α-methyl-6β-fluoro-pregnane-3β,5α-diol-20-one.

When applying the above procedure to 16α-methyl-6β-chloro - pregnane - 3β,5α - diol - 20 - one - 3 - acetate and 16α-methyl - 6β - bromo-pregnane - 3β,5α - diol-20-one-3-acetate there were correspondingly obtained: 16α-methyl - 6β - chloro - pregnane - 3β,5α - diol - 20 - one and 16α-methyl-6β-bromo-pregnane-3β,5α-diol-20-one.

EXAMPLE 5

A solution of 5 g. of 16α-methyl-6β-fluoropregnane-3β,5α-diol-20-one in 300 cc. of pure acetone was cooled to 0° C., flushed with nitrogen and treated with 8 N chromic acid which was added in a slow stream until the color of chromic acid persisted in the mixture; the 8 N solution of chromic acid had been prepared by dissolving 26.7 g. of chromium trioxide in 23 cc. of concentrated sulfuric acid and diluting with water to 100 cc. The mixture was stirred for 5 minutes further at 0° C., then diluted with water and the precipitate was collected, washed with water, dried and recrystallized from acetone-hexane, thus giving 16α-methyl-6β-fluoro-pregnan-5α-ol-3,20-dione.

A slow stream of dry hydrogen chloride was introduced for 2 hours into a solution of 5 g. of the above compound in 200 cc. of glacial acetic acid, maintaining the temperature below 18° C. After pouring into ice water the precipitate was collected, washed with water, dried and recrystallized from acetone-hexane. There was thus obtained 16α-methyl-6α-fluoro-progresterone, M.P. 158–160° C. $[\alpha]_D+57°$.

EXAMPLE 6

In accordance with the method of the preceding example there were prepared 5 g. of 16α-methyl-6β-fluoro-pregnan-5α-ol-3,20-dione, which was dissolved in 200 cc. of glacial acetic acid, treated with 2 cc. of concentrated hydrochloric acid and allowed to react at room temperature for 2 hours. After diluting with ice water, the product was isolated as described in the preceding example, thus yielding 16α-methyl-6β-fluoro-progresterone.

A part of the latter was treated with dry hydrogen chloride in glacial acetic acid, exactly as described in the preceding example, to produce 16α-methyl-6α-fluoro-progresterone, identical with the final compound of such example.

EXAMPLE 7

By the methods described in Examples 5 and 6 there was oxidized the 3β-hydroxyl group of 16β-methyl-6β-fluoro-pregnane-3β,5α-diol-20-one to form the keto group at C–3; the product was then dehydrated at C–5 with or without inverting the steric configuration at C–6, to produce 16β-methyl-6α-fluoro-progesterone or its 6β-isomer, respectively.

Following the same procedures there were oxidized: 16α-methyl -6β-chloropregnane-3β-5α-diol - 20 - one, 16α-methyl-6β-bromo-pregnane-3β-5α-diol-20-one, 16β - methyl-6β-chloropregnane-3β-5α-diol-20-one and 16β-methyl-6β-bromo-pregnane 3β-5α-diol-20-one, thus affording the corresponding 3-keto derivatives which upon dehydration at C–5 with or without invertion at C–6 produced correspondingly 16α-methyl-6α-chloro-progesterone, 16α-methyl-6α-bromo-progesterone, 16β-methyl - 6α - chloro-progesterone and 16β-methyl-6α-bromo-progesterone or the respective 6β-isomers thereof.

EXAMPLE 8

A solution of 5 g. of 16α-methyl-6α-fluoroprogesterone in 37.5 cc. of tetrahydrofuran and 23 cc. of methanol was treated under continuous stirring and in small portions with 7.5 g. of pure calcium oxide and then with 7.5 g. of iodine. The mixture was stirred until the color disappeared almost completely and then it was poured into ice water containing 22.5 cc. of acetic acid and 2.5 g. of sodium thiosulfate. After stirring for 15 minutes the liquid was decanted and the precipitate was collected by filtration thus giving 16α-methyl-6α-fluoro-21-iodo-Δ⁴-pregnene-3,20-dione.

The above compound was washed with water, dried under vacuum and mixed with 125 cc. of anhydrous acetone and 10 g. of recently fused potassium acetate; the mixture was refluxed for 18 hours under anhydrous conditions, the acetone was removed by distillation and the residue was treated with water. The water was decanted from the oil which separated and the latter was dissolved in methylene chloride; the solution was washed with water, dried over anhydrous sodium sulfate and the methylene chloride was distilled. The residue was refluxed for 15 minutes with a solution of 1.3 g. of sodium bisulfite in 60 cc. of methanol and 12.5 cc. of water, the solvent was removed under reduced pressure and the residue was treated with ice water; the precipitate was collected, washed with water, dried and recrystallized from acetone-water (8:1). There was thus obtained the acetate of 16α-methyl-6α-fluoro-desoxycorticosterone.

By the method described in the preceding example, the respective 16-methyl-6-halo-progesterones were converted into the 21-acetates of 16α-methyl-6β-fluoro-desoxycorticosterone,
16β-methyl-6α-fluoro-desoxycorticosterone,
16β-methyl-6β-fluoro-desoxycorticosterone,
16α-methyl-6α-chloro-desoxycorticosterone,
16α-methlyl-6β-chloro-desoxycorticosterone,
16β-methyl-6α-chloro-desoxycorticosterone,
16β-methyl-6β-chloro-desoxycorticosterone,
16α-methyl-6α-bromo-desoxycorticosterone,
16α-methyl-6β-bromo-desoxycorticosterone,
16β-methyl-6α-bromo-desoxycorticosterone and
16β-methyl-6β-bromo-desoxycorticosterone.

EXAMPLE 10

A mixture of 2 g. of 16α-methyl-6α-fluoro-progesterone, 100 cc. of t-butanol, 800 mg. of selenium dioxide and a few drops of pyridine was refluxed for 48 hours under an atmosphere of nitrogen, filtered through celite and the solvent was evaporated under reduced pressure. The residue was dissolved in acetone, treated with decolorizing charcoal under reflux for 1 hour, the charcoal was removed by filtration and the acetone was evaporated. The crude product was purified by chromatography on neutral alumina, thus affording 16α-methyl-6α-fluoro-1-dehydro-progesterone.

A mixture of 1 g. of the above compound, 2 g. of chloranil, 25 cc. of ethyl acetate and 5 cc. of acetic acid was refluxed under an atmosphere of nitrogen for 60 hours and then cooled. The mixture was washed with 10% aqueous sodium hydroxide solution until the washings were colorless, then with water to neutral, dried over anhydrous sodium sulfate and evaporated to dryness under reduced pressure. Upon subsequent chromatography on neutral alumina there was obtained 16α-methyl-6-fluoro-Δ¹,⁴,⁶-pregnatriene-3,20-dione.

EXAMPLE 11

2 g. of 16α-methyl-6α-fluoro-progesterone was subjected to the reaction with chloranil described in the preceding example to produce 16α-methyl-6-fluoro-Δ⁴,⁶- pregnadiene-3,20-dione; also following the procedure described in the preceding example, there was then introduced the third double bond at C–1,2 by refluxing with selenium dioxide to obtain 16α-methyl-6-fluoro-Δ¹,⁴,⁶-pregnatriene-3,20-dione, identical with the final compound of the preceding example.

EXAMPLE 12

A mixture of 1 g. of 16α-methyl-6β-fluoro-progesterone, 2 g. of chloranil and 30 cc. of n-amyl alcohol was refluxed for 72 hours under an atmosphere of nitrogen, diluted with water and extracted several times with methylene chloride; the extract was washed with 10% aqueous sodium hydroxide solution until the washings were colorless then with water, dried over anhydrous sodium sulfate and the solvent was evaporated. By chromatography of the residue on neutral alumina there was obtained 16α-methyl - 6-fluoro-Δ¹,⁴,⁶-pregnatriene - 3,20-dione, identical with the final compounds of Examples 10 and 11.

EXAMPLE 13

By applying the methods of dehydrogenation at C–1, 2 and/or C–6, 7, there were introduced additional double bonds into all of the compounds which are obtained by methods of Examples I–V. There were prepared the dehydro-analogs of 16α-methyl-6α-fluoro-progesterone, 16β-methyl-6β-fluoro-progesterone, 16α-methyl-6α-fluoro-desoxycorticosterone acetate, 16β-methyl - 6α-fluoro-desoxy-corticosterone acetate, 16β-methyl-6β-fluoro-desoxy-corticosterone acetate, 16α-methyl - 6β-fluoro - desoxy-corticosterone acetate, 16α-methyl - 6α-chloro-progesterone, 16α-methyl - 6β-chloro-progesterone, 16β-methyl-6α-chloro-progesterone, 16β-methyl - 6β-chloro-progesterone, 16α-methyl - 6α-bromo-progesterone, 16α-methyl - 6β-bromo-progesterone, 16β-methyl - 6α-bromo-progesterone, 16β-methyl - 6β-bromo-progesterone, 16α-methyl-6α-chloro - desoxycorticosterone-acetate, 16α-methyl - 6β-chloro - desoxycorticosterone acetate, 16β-methyl - 6α-chloro - desoxycorticosterone acetate, 16β-methyl - 6β-chloro - desoxycorticosterone acetate, 16α-methyl - 6α-bromo - desoxycorticosterone acetate, 16α-methyl - 6β-bromo - desoxycorticosterone acetate, 16β-methyl - 6α-bromo - desoxycorticosterone acetate, 16β-methyl - 6β-bromo - desoxycorticosterone acetate and the 6-dehydro and 1,6-bisdehydro-derivatives thereof.

EXAMPLE 14

A mixture of 1 g. of the 21-acetate of 16α-methyl-6α-fluoro-desoxycorticosterone and 50 cc. of 0.5% methanolic sodium hydroxide solution was stirred for 1 hour at 5° C., acidified with acetic acid, concentrated to a small volume, diluted with ice water and the precipitate was collected, washed with water, dried and recrystallized from acetone-hexane, thus giving the free 16α-methyl-6α-fluoro-desoxycorticosterone.

A solution of 500 mg. of the above compound in 5 cc. of pyridine was treated with 1 cc. of propionic anhydride and the mixture was allowed to react overnight at room temperature and then diluted with water, heated on the steam bath for half an hour and cooled. The precipitate was collected, washed with water, dried and recrystallized from acetone-hexane, thus furnishing the 21-propionate of 16α-methyl-6α-fluoro-desoxycorticosterone.

Upon subsequent treatment with selenium dioxide by the method described in Example 10 there was obtained the 21-propionate of 16α-methyl-6α-fluoro - 1-dehydro-desoxycorticosterone; by reaction of the latter with chloranil, in accordance with the method described in the same example, there was then obtained the propionate of 16α-methyl - 6-fluoro - 1,6-bis-dehydro-desoxycorticosterone.

EXAMPLE 15

By applying the method described in the preceding example, the 21-acetate of 16α-methyl - 6β-fluoro-desoxycorticosterone was hydrolyzed to the free 16α-methyl - 6β-fluoro-desoxycorticosterone.

500 mg. of the above compound was treated with 2.6 g. of cyclopentylpropionic anhydride and 5 cc. of pyridine, kept for 24 hours at room temperature, diluted with water and extracted with methylene chloride; the extract was washed with dilute hydrochloric acid and water, dried over anhydrous sodium sulfate and the solvent was evaporated. By chromatography of the residue on neutral alumina, there was obtained the cyclopentylpropionate of 16α-methyl-6β-fluoro-desoxycorticosterone. By following the method of dehydrogenation described in Example 10, there were then introduced additional double bonds at C–1, 2 and C–6, 7.

EXAMPLE 16

Following the technique described in Example 14 were hydrolyzed the 21-acetates of 16α-methyl - 6α-chloro-desoxycorticosterone, 16α-methyl - 6β-chloro-desoxycorticosterone, 16β-methyl - 6α-chloro-desoxycorticosterone, 16β-methyl - 6β-chloro-desoxycorticosterone, 16α-methyl-6α-bromo-desoxycorticosterone, 16α-methyl - 6β-bromo-desoxycorticosterone, 16β-methyl - 6α-bromo-desoxycorticosterone and 16β-methyl - 6β-bromo-desoxycorticosterone thus affording the corresponding 21-free alcohols, which upon treatment with propionic anhydride by the method described in the same example, there were obtained the respective 21-propionates. Upon subsequent treatment with selenium dioxide by the method described in Example 10, there were obtained the 21-propionate-1-dehydro derivatives which by reaction with chloranil in accordance with the method described in the same example afforded the corresponding 21-propionate-1,6-bis-dehydro-desoxycorticosterones.

We claim:
1. A compound of the following formula:

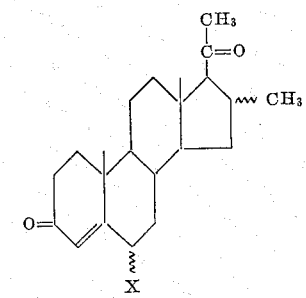

wherein X is selected from the group consisting of fluorine, chlorine and bromine.
2. 6α-fluoro-16α-methyl-progesterone.
3. 6β-fluoro-16α-methyl-progesterone.
4. 6α-chloro-16α-methyl-progesterone.
5. 6β-chloro-16α-methyl-progesterone.
6. 6α-fluoro-16β-methyl-progesterone.
7. 6β-fluoro-16β-methyl-progesterone.
8. 6α-chloro-16β-methyl-progesterone.
9. 6β-chloro-16β-methyl-progesterone.
10. A compound of the following formula:

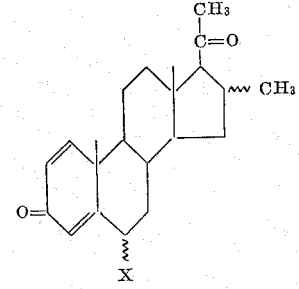

wherein X is selected from the group consisting of fluorine, chlorine and bromine.
11. A compound of the following formula:

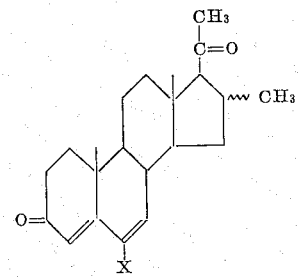

wherein X is selected from the group consisting of fluorine, chlorine and bromine.

12. A compound of the following formula:

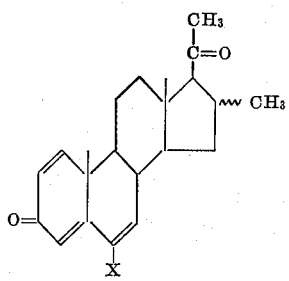

wherein X is selected from the group consisting of fluorine, chlorine and bromine.

13. A compound of the following formula:

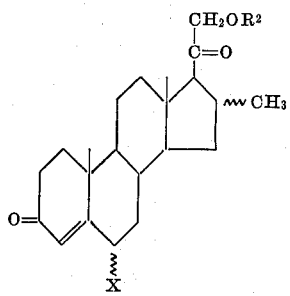

wherein X is selected from the group consisting of fluorine, chlorine and bromine and $R^2$ is selected from the group consisting of hydrogen and a hydrocarbon carboxylic acyl group of less than 12 carbon atoms.

14. A compound of the following formula:

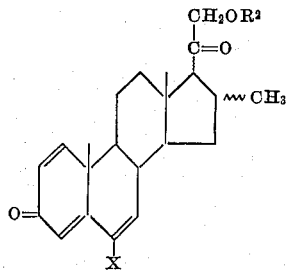

wherein X is selected from the group consisting of fluorine, chlorine and bromine and $R^2$ is selected from the group consisting of hydrogen and a hydrocarbon carboxylic acyl group of less than 12 carbon atoms.

15. A compound of the following formula:

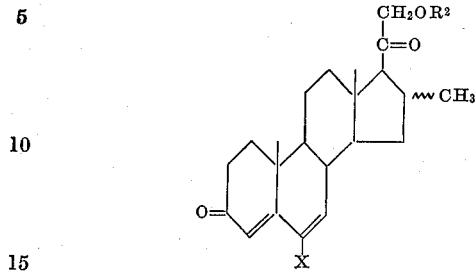

wherein X is selected from the group consisting of fluorine, chlorine and bromine and $R^2$ is selected from the group consisting of hydrogen and a hydrocarbon carboxylic acyl group of less than 12 carbon atoms.

16. A compound of the following formula:

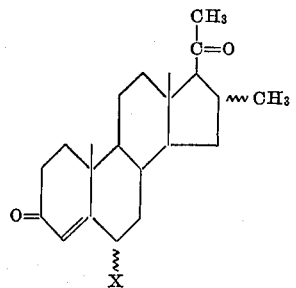

wherein X is a halo and the wavy line indicates the substituents at C-6 and C-16 can be in the α or β configuration.

References Cited by the Examiner

UNITED STATES PATENTS 2,838,528  6/1958  Campbell et al. ____ 260—397.3

OTHER REFERENCES

Ringold et al.: J.A.C.S. 81 pp., 3485–86.

ELBERT L. ROBERTS, *Primary Examiner.*

LEWIS GOTTS, IRVING MARCUS, *Examiners.*

HENRY A. FRENCH, *Assistant Examiner.*